United States Patent
Ardrey (10) Patent No.: US 9,044,097 B1
(45) Date of Patent: Jun. 2, 2015

(54) LEG CUSHIONING AND RELATIVE PLACEMENT SYSTEM

(71) Applicant: Michael Robert Ardrey, Raleigh, NC (US)

(72) Inventor: Michael Robert Ardrey, Raleigh, NC (US)

( * ) Notice: Subject to any disclaimer, the term of this patent is extended or adjusted under 35 U.S.C. 154(b) by 0 days.

(21) Appl. No.: 13/923,246

(22) Filed: Jun. 20, 2013

Related U.S. Application Data (60) Provisional application No. 61/665,955, filed on Jun. 29, 2012, provisional application No. 61/728,567, filed on Nov. 20, 2012.

(51) Int. Cl.
| | |
|---|---|
| A47C 31/00 | (2006.01) |
| A47B 97/08 | (2006.01) |
| A47B 37/00 | (2006.01) |
| A47C 7/52 | (2006.01) |

(52) U.S. Cl.
CPC .......................................... *A47C 7/52* (2013.01)

(58) Field of Classification Search
USPC ....................... 297/466; 248/444, 460; 108/43
See application file for complete search history.

(56) References Cited

U.S. PATENT DOCUMENTS

| | | | | |
|---|---|---|---|---|
| 1,546,116 A | * | 7/1925 | Bradt | 248/444 X |
| 1,802,620 A | * | 4/1931 | Scully | 297/113 |
| 1,845,338 A | | 2/1932 | Querna | |
| 1,869,278 A | * | 7/1932 | Ramelli | 248/455 |
| 2,562,725 A | * | 7/1951 | Leto et al. | 5/631 |
| 2,765,480 A | * | 10/1956 | Mueller | 5/640 |
| 2,783,109 A | * | 2/1957 | Frey | 108/43 |
| 2,952,856 A | * | 9/1960 | Ruff | 5/640 |
| 2,979,990 A | * | 4/1961 | Alexander | 108/43 X |
| 3,173,722 A | * | 3/1965 | Carbonetti | 297/466 X |
| 3,496,935 A | | 2/1970 | Bell et al. | |
| 3,893,729 A | * | 7/1975 | Sherman et al. | 297/118 |
| 4,119,289 A | * | 10/1978 | Kanocz | 248/460 X |
| 4,190,287 A | * | 2/1980 | Lemisch et al. | 297/466 |
| 4,192,546 A | * | 3/1980 | Smith | 297/466 |
| 4,506,396 A | * | 3/1985 | Ritchie et al. | 5/631 |
| 4,512,047 A | | 4/1985 | Johnson | |
| 4,528,981 A | * | 7/1985 | Behar | 5/637 |
| D282,036 S | | 1/1986 | Ritchie et al. | |
| D284,151 S | | 6/1986 | Johnson et al. | |
| 4,607,402 A | * | 8/1986 | Pollard | 5/425 |
| D292,460 S | | 10/1987 | Malin | |
| 5,005,702 A | * | 4/1991 | Davis et al. | 108/43 X |
| 5,018,790 A | * | 5/1991 | Jay | 297/452.26 |
| 5,040,522 A | * | 8/1991 | Daniels | 601/24 |
| 5,054,736 A | * | 10/1991 | Champoux | 248/444 |
| 5,120,300 A | | 6/1992 | Shaw | |
| 5,127,339 A | * | 7/1992 | Hood, Jr. | 108/43 |
| 5,165,130 A | * | 11/1992 | Wendling | 5/655 |
| 5,193,238 A | * | 3/1993 | Clute | 5/655 |

(Continued)

*Primary Examiner* — Rodney B White
(74) *Attorney, Agent, or Firm* — RG Patent Consulting, LLC; Rachel Gilboy (57) ABSTRACT

Leg Ease provides users with a way to relax their legs when travelling long distances. The device may come in different embodiments, one that wraps around both of a user's legs and then secures at the top. This allows users to fully relax their legs without touching the person next to them. Leg Ease helps align a user's hips, knees and ankles in their natural positions, thereby reducing the stress on those joints. Leg Ease provides a soft barrier between a person's legs and the rigid, narrow, and sharp edges of a chair. Leg Ease effectively prevents knee-to-knee contact when sitting between two people which helps to ensure a more relaxed and private travel experience. Leg Ease can be easily placed in a bag or pocket for use at any time.

20 Claims, 5 Drawing Sheets

(56) References Cited

U.S. PATENT DOCUMENTS

| | | | | |
|---|---|---|---|---|
| 5,216,772 | A * | 6/1993 | Clute | 5/655 |
| 5,255,612 | A * | 10/1993 | Anderson | 108/43 |
| 5,263,423 | A * | 11/1993 | Anderson | 108/43 |
| D342,411 | S | 12/1993 | Graebe | |
| 5,272,780 | A * | 12/1993 | Clute | 5/655 |
| 5,310,245 | A * | 5/1994 | Lyszczasz | 297/219.12 |
| 5,342,116 | A * | 8/1994 | Walton | 297/466 |
| 5,350,217 | A * | 9/1994 | Kanigowski | 297/466 X |
| 5,355,811 | A * | 10/1994 | Brewer | 108/43 |
| 5,357,642 | A * | 10/1994 | Clute | 5/655 |
| 5,367,730 | A * | 11/1994 | Sher | 5/655 |
| D389,359 | S * | 1/1998 | Nowak | D6/601 |
| 5,713,548 | A * | 2/1998 | Boyer et al. | 108/43 X |
| 5,779,211 | A * | 7/1998 | Bird | 248/346.01 |
| 5,806,929 | A * | 9/1998 | Choi | 297/466 X |
| 5,833,200 | A * | 11/1998 | Patterson | 248/456 |
| 5,893,540 | A * | 4/1999 | Scott | 108/43 X |
| 5,937,765 | A * | 8/1999 | Stirling | 108/43 |
| 6,027,092 | A * | 2/2000 | Gordon | 248/444 |
| 6,044,758 | A * | 4/2000 | Drake | 100/43 |
| 6,097,294 | A * | 8/2000 | Hilton | 340/573.1 |
| 6,123,392 | A * | 9/2000 | Alfred et al. | 297/466 |
| 6,349,993 | B1 * | 2/2002 | Walsh | 297/466 |
| 6,378,947 | B1 * | 4/2002 | Barber et al. | 297/466 X |
| 6,496,360 | B1 * | 12/2002 | Cordes et al. | 108/43 X |
| 6,578,218 | B2 | 6/2003 | Wassilefsky | |
| 6,604,783 | B2 * | 8/2003 | Goodson | 297/170 |
| 6,663,072 | B1 * | 12/2003 | Ritchey et al. | 248/444 |
| D494,128 | S * | 8/2004 | Berger | D12/416 |
| 6,840,577 | B2 * | 1/2005 | Watkins | 297/284.9 |
| 6,971,715 | B2 * | 12/2005 | Hankins | 297/219.11 |
| D523,679 | S * | 6/2006 | Illingworth | D6/601 |
| 7,055,442 | B2 * | 6/2006 | Podd et al. | 108/43 X |
| 7,166,083 | B2 | 1/2007 | Bledsoe | |
| 7,255,396 | B1 * | 8/2007 | Anikin | 297/466 X |
| 7,346,949 | B2 * | 3/2008 | Kamrin-Balfour | 5/655 |
| 7,360,265 | B2 * | 4/2008 | Lamer | 5/655 |
| 7,954,900 | B2 | 6/2011 | Shantha et al. | |
| 7,959,231 | B2 * | 6/2011 | Lee | 297/411.2 |
| 7,992,502 | B1 * | 8/2011 | Davis | 108/43 |
| 8,104,733 | B2 * | 1/2012 | Skolnik | 248/444 X |
| 8,215,242 | B2 * | 7/2012 | Aguayo | 108/43 |
| D670,122 | S * | 11/2012 | Childress | D6/601 |
| 8,347,429 | B1 * | 1/2013 | Hawkins | 5/424 |
| 8,365,327 | B2 * | 2/2013 | Jamshidi | 5/631 |
| 8,672,401 | B2 * | 3/2014 | Schreiber | 297/182 |
| 8,713,733 | B2 * | 5/2014 | Caforio | 5/648 |
| 2002/0145019 | A1 * | 10/2002 | Ulibarri | 108/43 X |
| 2004/0251725 | A1 * | 12/2004 | Jenkins | 297/466 X |
| 2005/0072893 | A1 * | 4/2005 | Brown | 248/444 |
| 2006/0250007 | A1 * | 11/2006 | Anikin | 297/284.9 |
| 2007/0089646 | A1 * | 4/2007 | Duncan | 108/43 |
| 2008/0061613 | A1 * | 3/2008 | Anikin | 297/284.9 |
| 2010/0231010 | A1 * | 9/2010 | Manley | 297/182 |
| 2011/0094028 | A1 | 4/2011 | Traykov | |
| 2014/0077054 | A1 * | 3/2014 | Heyen | 248/444 |

* cited by examiner

LEG CUSHIONING AND RELATIVE PLACEMENT SYSTEM

CROSS-REFERENCE TO RELATED APPLICATION

The present application is related to and claims priority from prior provisional application Ser. Nos. 61/665,955, filed Jun. 29, 2012 and 61/728,567, filed Nov. 20, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of comforting devices and more specifically relates to a leg cushioning and relative placement system.

2. Description of the Related Art

Many individuals travel frequently in modem society. Many modes of transportation are available to users including private and public. When traveling by bus, train or plane, (public modes) passengers often have to sit close to one another to provide efficiency for the provider. While relaxing in a natural position, a person's knees may fall outward, touching the passenger on either side. This can be uncomfortable for both passengers and promote poor posture. If a user's leg leans against an extended armrest between the seats, a user's full weight could be concentrated in one spot, which may lead to discomfort (pressure points) or even injury. If passengers try to hold their legs together, they have a tendency of becoming fatigued, tense and irritable, especially on long trips.

When sitting in public places, such as on a train, in a stadium, or on an airplane, people often make direct contact with the people sitting next to them. This can be highly uncomfortable and is often socially awkward. Additionally, many chairs have rigid surfaces and hard edges, which can also be uncomfortable. An effective solution is needed whereby a user (passenger or non-passenger) can wear or otherwise use a device whereby relative and desired positioning is maintained with relative ease over an extended duration allowing the body to be at ease.

Various attempts have been made to solve the above-mentioned problems such as those found in U.S. Pub. And Pat. Nos. D284,151; U.S. Pat. No. 4,512,047; D292,460; D282, 036; D342,411; U.S. Pat. Nos. 6,578,218; 3,496,935; 1,845, 338; 7,954,900; 7,166,083; 2011/0094028; and U.S. Pat. No. 5,120,300. This art is representative of comforting devices and means. None of the above inventions and patents, taken either singly or in combination, is seen to describe the invention as claimed.

Ideally, a leg cushioning and relative placement system should provide users with a comfortable, relative positioning means for their legs and, yet would operate reliably and be manufactured at a modest expense. Thus, a need exists for a reliable leg cushioning and relative placement system to avoid the above-mentioned problems.

BRIEF SUMMARY OF THE INVENTION

In view of the foregoing disadvantages inherent in the known comforting and relaxation inducement means art, the present invention provides a novel leg cushioning and relative placement system. The general purpose of the present invention, which will be described subsequently in greater detail is to provide users with a comfortable, relative positioning means for their legs and core during travel and non-travel durations.

The present invention according to a preferred embodiment provides a soft barrier between a person's legs and the rigid, narrow, and sometimes sharp edges of a chair. It effectively prevents knee-to-knee contact when sitting between two people which helps to ensure a more relaxed and private travel experience. The device can be easily placed in a bag or pocket for use at any time. The device may be wrapped together (one adjacent the other) and secured via hook and loop or other suitable means. The leg cushion is ideal for use with airplane chairs, stadium seating, mass transit trains, office chairs, and virtually any other similar chair. Pneumatic and non-pneumatic versions may be available for use. Further, the devices mentioned herein may be used in non-travel applications such as while working at a desk or the like simply to reduce fatigue and to maintain proper posture to promote health.

Another embodiment of Leg Ease provides users with a way (means) to relax their legs and core when travelling long distances (or during non-travel episodes). The invention wraps around both legs of a user and then secures at the top via fastening means such as those produced under the tradename VELCRO®. This allows users to fully relax their legs without touching the person next to them. The invention helps align a user's hips, knees and ankles in their natural positions, thereby reducing the stress on those joints. The product can be lightweight and easy to bring along in carry-on bags. Individuals who travel frequently and want to relax their legs during the journey may find use with this innovative item.

A leg cushioning and relative placement system is disclosed herein, in a preferred embodiment, comprising: a first leg-cushion assembly (including a first leg-cushion and a first leg-anchor); a second leg cushion assembly (including a second leg-cushion and a second leg-anchor). The leg cushioning and relative placement system comprises the first leg-cushion assembly and the second leg cushion assembly in combination.

Each of the first leg-cushion and the second leg-cushion provide a barrier preventing contact with an adjacent edge of a seat (and from contacting other individuals and objects). The first leg-anchor and the second leg-anchor are flexible; wherein the first and the second leg-anchor(s) are frictionally held in place when used by a right-leg and a left-leg, respectively, the right-leg and the left-leg being of an occupant (traveler-user or non-traveler-user). The first leg-anchor and the second leg-anchor are respectively located between the right-leg and the left-leg and the seat when used such that the weight (mass) of the individual holds the device in place. The first leg-cushion assembly and the second leg cushion assembly in combination help keep positioning of the right-leg and the left-leg of the occupant consistent on the seat.

The first leg-cushion and the first leg-anchor are coupled together as the first leg-cushion assembly as are the second leg-cushion and the second leg-anchor coupled together as the second leg cushion assembly. In preferred embodiments the first covering and the second covering each comprise fabric that is able to breathe; however alternate embodiments may comprise different materials. The first leg-cushion and the second leg-cushion each may comprise a memory foam material; however other cushioning means may be used such as air. Ideally, the device conforms to the shape of the user's leg for maximized comfort in use. The first leg-cushion and the second leg-cushion each comprise a 3-D wedge with a wide end adjacent a knee of the user when used (in the sitting position), the wide end narrowing progressively to a narrow end.

The first leg-anchor and the second leg-anchor each comprise a flat profile. The first leg-anchor and the second leg-anchor each also preferably comprise fabric. The first leg-cushion assembly and the second leg cushion assembly are normally located a distance from each other during use, however may be effectively adjacent during use depending on the available room and size of the seat it is being used on.

The first leg-cushion and the second leg-cushion are encased by a first covering and second covering respectively, the first leg-cushion also comprising a first-seat-arm-engaging-plate (hard backing) and similarly the second leg-cushion also comprises a second-seat-arm-engaging-plate; the first-seat-arm-engaging-plate and the second-seat-arm-engaging-plate preventing substantial deformation of the first leg-cushion and the second leg-cushion during use such that they maintain their effectiveness for cushioning. The first leg-cushion assembly and the second leg-cushion assembly mirror each other's relative position during use.

In preferred embodiments the first leg-cushion assembly and the second leg cushion assembly further comprise sleeves with adjustable extenders (which may comprise rods) to prevent activation (depression) of a reclining button of the seat by the first leg-cushion and/or the second leg-cushion (depending on the side that the reclining button is located on); wherein the adjustable extenders are also able to adjust to and accommodate to different height seat arms. This feature makes the device universal in use with respect to seat sizes and profiles. The first leg-cushion and the second leg-cushion each travel along a partial-length of the right-leg and the left-leg of the user, respectively. The first leg-cushion and the second leg-cushion may each comprise pockets for storage of travel items. As such, the leg cushioning and relative placement system provides comfort for the occupant when travelling (or just sitting stationary); the occupant occupying the seat yet able to maintain relative positioning of the right-leg and the left-leg and also reducing leg and core muscle fatigue.

A kit as described herein preferably includes: the first leg-cushion assembly; the second leg-cushion assembly; a lap-desk; and a set of user instructions. The kit may be marketed in airports and office supply stores as well as other venues.

A method of using a leg cushioning and relative placement system is also disclosed herein for a preferred embodiment comprising the steps of: placing a first leg-cushion assembly in place on a seat adjacent a first seat edge; placing a second leg-cushion assembly in place on the seat adjacent a second seat edge; sitting down on top of a first leg-anchor and a second leg-anchor; and adjusting as necessary to minimize leg and core fatigue and undesirable contact with other adjacent passengers. Pneumatic versions may comprise an intaking air to a proper amount (volume) step; air is held and released as desired from bladders. The 'wrap' version may comprise a method of wrapping the legs before use and unwrapping after use.

The present invention holds significant improvements and serves as a leg cushioning and relative placement system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, leg cushioning and relative placement system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to comforting devices and travel accessories and more particularly to a leg cushioning and relative placement system as used to improve the comfort and relaxation of users. The present invention also serves to prevent (or at least minimize) contact with adjacent travelers and with seat edges.

Generally speaking, Leg Cushion in a preferred embodiment enables people to comfortably sit in virtually any type of chair without touching the person next to them. This innovative product may comprise a padded cushion, made of foam, memory foam, a blowup bladder, or other suitable material, covered with soft, breathable material. Affixed to one side of the padding can be a flat, hard plate. A rubberized or cloth flap can be attached to the base and can act as an anchor for increased stability. The anchor flap can be placed under a person's leg to hold the cushion in position while in use. A small suction cup can be affixed to the hard plate to further anchor or stabilize the cushion to a chair if desired. Finally, a small strap with hook-and-loop fastening material or a button can be attached to the side to anchor to the seatbelt if desired.

Figure 1:
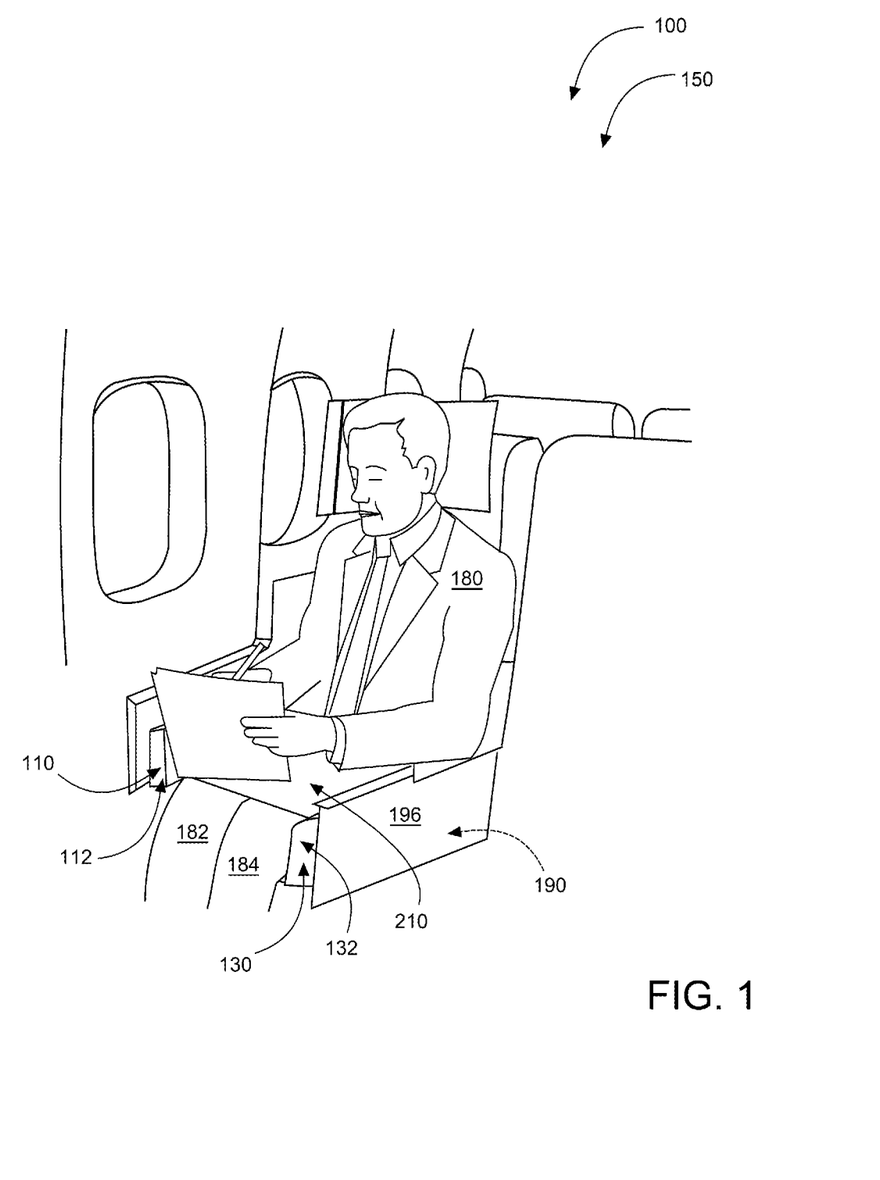
FIG. 1 shows a perspective view illustrating a leg cushioning and relative placement system in an in-use condition according to an embodiment of the present invention.

Referring to the drawings by numerals of reference there is shown in FIG. 1 showing a perspective view illustrating leg cushioning and relative placement system 100 in in-use condition 150 according to an embodiment of the present invention.

Leg cushioning and relative placement system 100 preferably comprises first leg-cushion assembly 110 (including first leg-cushion 112; and first leg-anchor 122); second leg cushion assembly 130 (including second leg-cushion 132; and second leg-anchor 142); wherein leg cushioning and relative placement system 100 comprises first leg-cushion assembly 110 and second leg cushion assembly 130 in combination. Each of first leg-cushion 112 and second leg-cushion 132 provide a barrier (isolating means) preventing contact with an adjacent edge 192 of seat 190.

First leg-anchor 122 and second leg-anchor 142 are flexible (non-rigid) in nature. First leg-anchor 122 and second leg-anchor 142 are frictionally held in place when used by right-leg 182 and left-leg 184, respectively; right-leg 182 and left-leg 184 being of user 180 occupant (traveler or non-traveler). User 180 may be a traveler as shown or a non-traveler such as a student or office worker/professional. First leg-anchor 122 and second leg-anchor 142 are respectively located between right-leg 182 and left-leg 184 and seat 190 when used. First leg-cushion assembly 110 and second leg cushion assembly 130 in combination help keep positioning of right-leg 182 and left-leg 184 of the occupant consistent on seat 190.

First leg-cushion 112 and first leg-anchor 122 are coupled together as first leg-cushion assembly 110. First leg-cushion 112 and first leg-anchor 122 comprise an inside-right-angle acting as a first-stop. Similarly, second leg-cushion 132 and second leg-anchor 142 are coupled together as second leg cushion assembly 142. Second leg-cushion 132 and second leg-anchor 142 comprise an inside-perpendicular-angle acting as a primary-stop. Leg cushioning and relative placement system 100 provides comfort for the occupant (user 180) when travelling; the occupant occupying seat 190 yet able to maintain relative positioning of right-leg 182 and left-leg 184 and also reducing leg (and core) strain.

First leg-cushion 112 and second leg-cushion 132 each comprise a 3-D wedge 160 with wide end 162 adjacent a knee of user 180 when used, as shown. First leg-cushion assembly 110 and second leg cushion assembly 130 are located a distance from each other during use (in-use condition 150).

Figure 2:
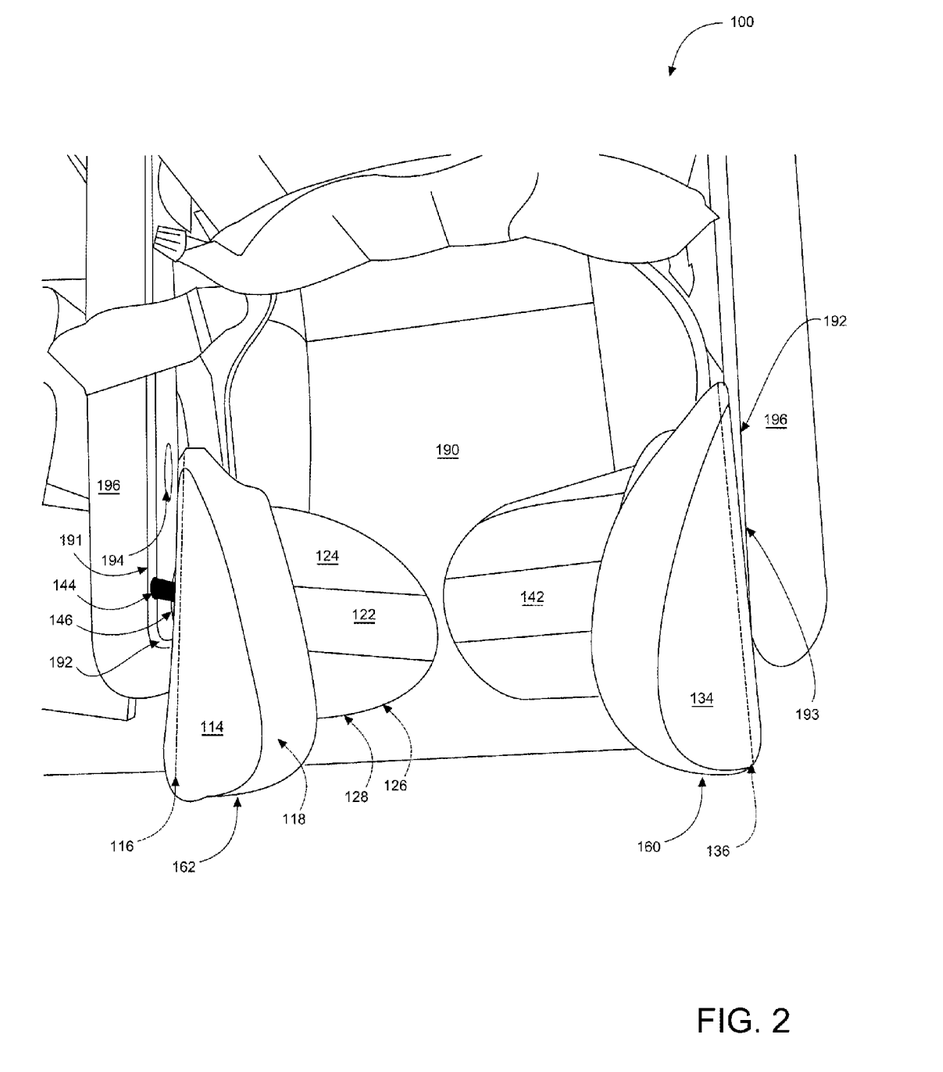
FIG. 2 is a top view illustrating the leg cushioning and relative placement system according to an embodiment of the present invention of FIG. 1.

Referring now to FIG. 2, a top view illustrating leg cushioning and relative placement system 100 according to an embodiment of the present invention of FIG. 1.

First leg-cushion 112 and second leg-cushion 132 are encased by first covering 114 and second covering 134 respectively; first leg-cushion 112 also comprising first-seat-arm-engaging-plate 116 and second leg-cushion 132 comprising second-seat-arm-engaging-plate 136. First-seat-arm-engaging-plate 116 and second-seat-arm-engaging-plate 136 preventing deformation of first leg-cushion 112 and second leg-cushion 132. First covering 114 and second covering 134 each preferably comprise fabric that is able to breathe so that perspiration is minimized and comfort maintained (rubbing of wet skin is minimized which would tend to create sores). First leg-cushion 112 and second leg-cushion 132 each comprise a semi-rigid memory foam material 118 in preferred embodiments. First leg-cushion 112 travels along a partial-length of right-leg 182. Similarly, second leg-cushion 132 travels along a partial-length of left-leg 184. First leg-cushion 112 and second leg-cushion 132 may each comprise pockets 148 for storage of travel items. First leg-cushion 112 and second leg-cushion 132 minor each other's positioning during set up and in-use condition 150.

Figure 3:
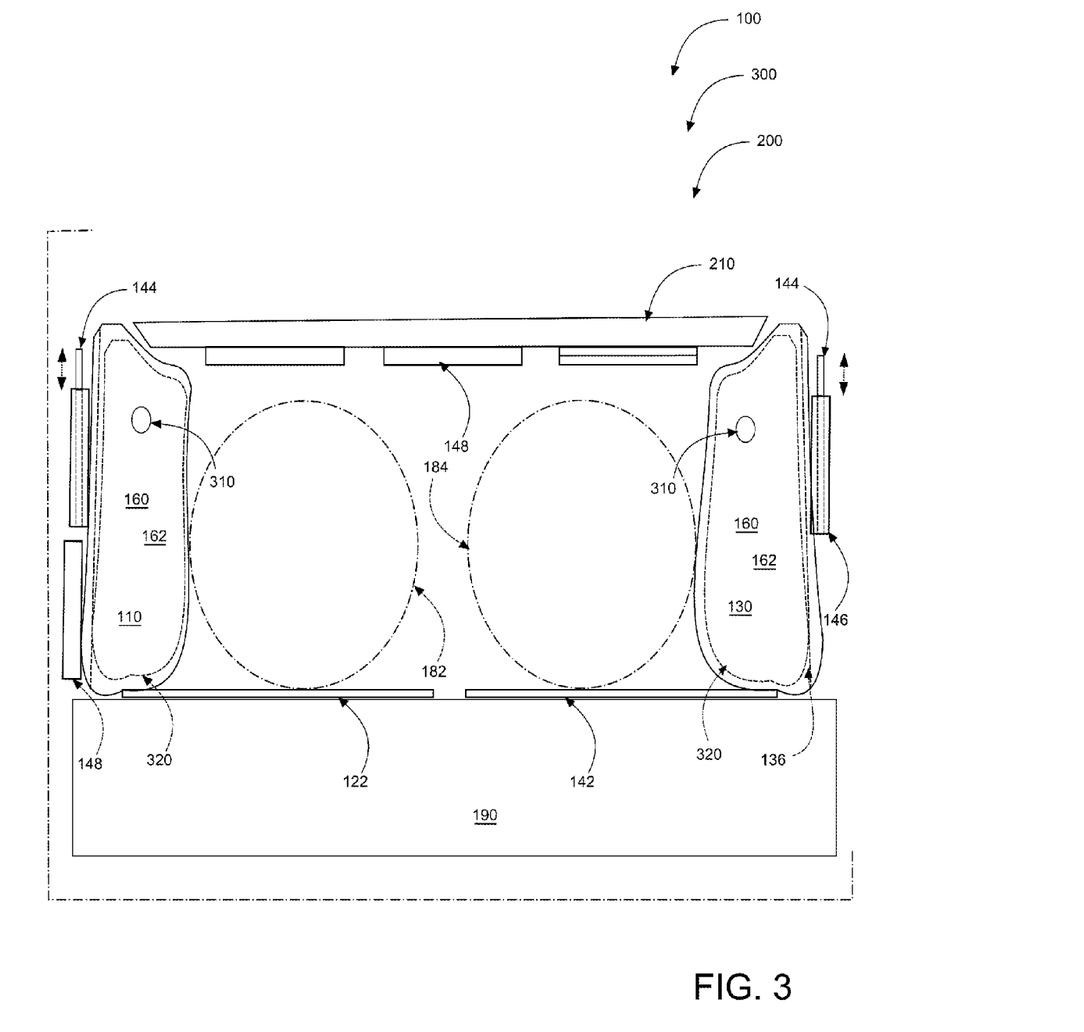
FIG. 3 is a perspective front view illustrating a first leg-cushion assembly and a second leg-cushion assembly of the leg cushioning and relative placement system (inflatable version) according to an alternate embodiment of the present invention of FIG. 1.

Referring now to FIG. 3 showing a perspective view illustrating first leg-cushion assembly 110 and second leg-cushion assembly 130 of leg cushioning and relative placement system 100 (inflatable version 300) according to an alternate embodiment of the present invention of FIG. 1.

First leg-anchor 122 and second leg-anchor 142 each comprise a flat profile. First leg-anchor 122 and second leg-anchor 142 each preferably comprise fabric. First leg-anchor 122 and second leg-anchor 142 each comprise top surface 124 and bottom surface 126. Top surface 124 does not comprise a grip-surface to minimize rubbing/chafing. Bottom surface 126 may comprise grip-surface 128 to minimize relative movement between right-leg 182 and left-leg 184 and seat 190. First leg-cushion assembly 110 and second leg cushion assembly 130 may further comprise sleeves 146 with adjustable extenders 144 to prevent activation of reclining button 194 of seat 190 by first leg-cushion 112 and/or second leg-cushion 132. Adjustable extenders 144 are able to accommodate to different height seat arms 196. Inflatable version 300 may comprise a 2-way (or other suitable) valve 310 that allows for self-inflating of the device in this particular embodiment. Air is used in inflatable version 300 as a cushioning means and may conform well to right-leg 182 and left-leg 184 substantially formed as 3-D wedge 160.

Figure 4:
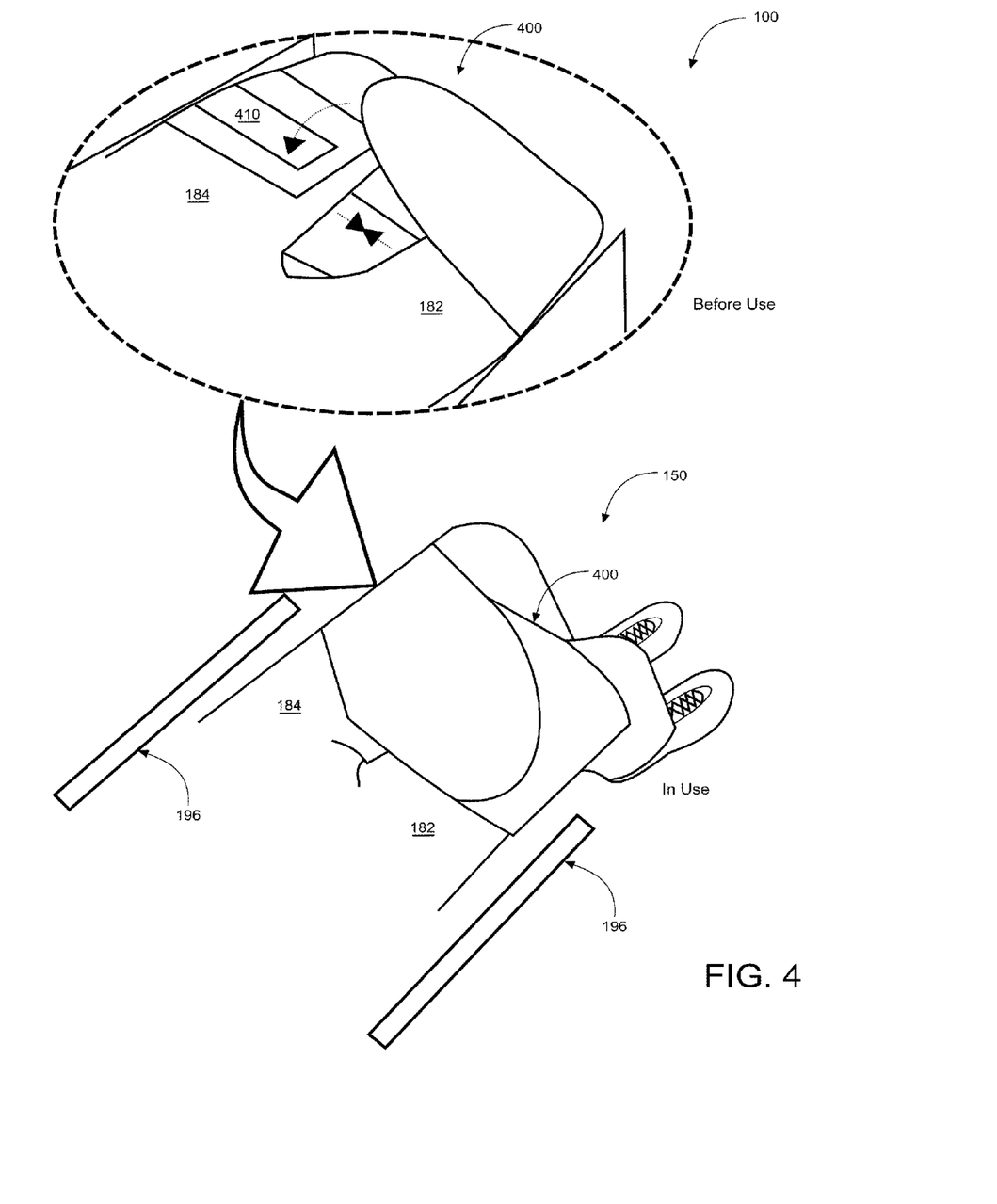
FIG. 4 is a perspective view illustrating the leg cushioning and relative placement system (wrap version) according to an embodiment of the present invention of FIG. 1.

Valve 310 may let air in when opened and when closed air is retained inside inflatable version 300. A valve cover (lid/cap) may also be used to retain air within an inner volume of confines of inflatable version 300. Those with ordinary skill in the art will now appreciate that upon reading this specification and by their understanding the art of inflation, valving, and air retaining means as described herein, methods of inflation and deflation will be understood by those knowledgeable in such art. It should be noted that suitably equivalent means may be used and are considered within the scope of this disclosure of the present invention. Memory foam material 118 is not typically used in inflatable version 300 or in wrap version 400, as detailed next. Inflatable version 300 and non-inflatable versions may be oriented to each other so as to be conducive to packing for travel or to take to work. They may be fastened back to back or as in wrap version 400 may be rolled or folded for convenient storage.

Referring now to FIG. 4, a perspective view illustrating leg cushioning and relative placement system 100 (wrap version 400) according to an embodiment of the present invention of FIG. 1. Wrap version 400 may comprise a single length of material having first and second sides with a suitable fastening means 410 (hook and loop or the like). First and second sides of wrap version 400 may be fastened to each other once wrapped about right-leg 182 and left-leg 184, as shown. Upon reading this specification, it should be appreciated that, under appropriate circumstances, considering such issues as user preferences, design preference, structural requirements, marketing preferences, cost, available materials, technological advances, etc., other fastening arrangements and means such as, for example, clips, clasps, etc., may be sufficient. Inflatable version 300, non-inflatable version and wrap version 400 essentially serve the same function in reducing stress on the body of user 180, and maintaining desired relative positioning, but are structurally different as shown and described in FIGS. 1-4.

As such, leg cushioning and relative placement system 100 (may also be referred to as Leg ease) in wrap version 400 is designed to comfortably strap a user's legs (right-leg 182 and left-leg 184) together while traveling. The present invention may be made of cotton, neoprene or other suitable thin material. The invention may measure about 12" wide and 3' to 5' long in preferred embodiments. Wrap version 400 of the device may wrap around a user's thighs or below the knees and be secured by hook and loop fasteners, buttons, hook and eye fasteners, belts with buckles or any other suitable binding means/method to comprise fastening means 410. In inflatable version 300 first leg-cushion 112 and second leg-cushion 132 each further comprise bladder 320 and valve 310 that provide for self-inflation.

Leg cushioning and relative placement system 100 may be sold as kit 200 preferably including first leg-cushion assembly 110; second leg-cushion assembly 130; lap-desk 210; and a set of user instructions. Lap-desk 210 may be coupled to first leg-cushion assembly 110, and second leg-cushion assembly 130 and used to operate a computer for example during flight. Leg cushioning and relative placement system 100 may be modular and may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
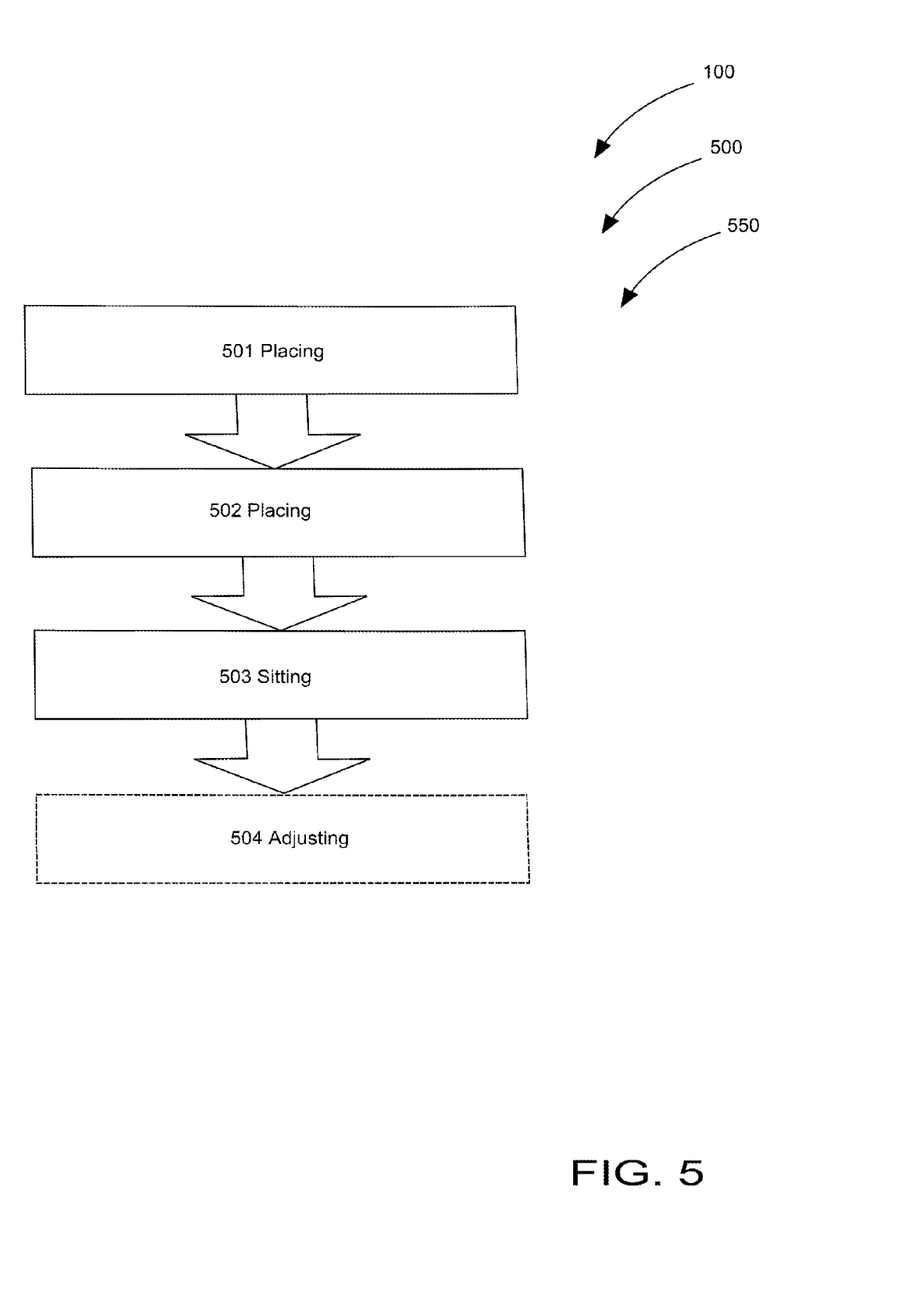
FIG. 5 is a flowchart illustrating a method of use for the leg cushioning and relative placement system according to an embodiment of the present invention of FIGS. 1-4.

Referring now to FIG. 5 is a flowchart 550 illustrating a method of use 500 for leg cushioning and relative placement system 100 according to an embodiment of the present invention of FIGS. 1-4.

A method of using (method of use 500) leg cushioning and relative placement system 100 may comprise the steps of: step one 501 placing first leg-cushion assembly 110 in place on seat 190 adjacent first seat edge 191; step two 502 placing second leg-cushion assembly 130 in place on seat 190 adjacent second seat edge 193; step three 503 sitting down on top of first leg-anchor 122 and second leg-anchor 142; and step four 504 adjusting as necessary to minimize leg and core fatigue and undesirable contact with other adjacent passengers.

It should be noted that steps of method 500 may be include other steps such as inflating and deflating in use of inflatable version 300 and may include steps of wrapping and unwrapping in use of wrap version 400.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A leg cushioning and relative placement system comprising:
   a) a first leg-cushion assembly including;
      i) a first leg-cushion;
      ii) a first leg-anchor;
      iii) a first-seat-arm-engaging-plate; and
   b) a second leg cushion assembly including;
      i) a second leg-cushion; and
      ii) a second leg-anchor;
      iii) a second seat-arm-engaging-plate;
   c) wherein said leg cushioning and relative placement system comprises said first leg-cushion assembly and said second leg cushion assembly and said first-seat-arm-engaging-plate in combination;
   d) wherein said first leg-cushion and said second leg-cushion and said first-seat-arm-engaging-plate provide a barrier preventing contact with an adjacent edge of a seat;
   e) wherein said first leg-cushion and said second leg-cushion comprises an inflatable element:
   f) wherein said first leg-cushion and said second leg-cushion comprises a pocket structured and arranged for storage of a travel item;
   g) wherein said first leg-anchor and said second leg-anchor are flexible;
   h) wherein said first leg-anchor and said second leg-anchor and said first-seat-arm-engaging-plate are frictionally held in place when used by a right-leg and a left-leg, respectively, said right-leg and said left-leg being of an occupant;
   i) wherein said first leg-anchor and said second leg-anchor and said first-seat-arm-engaging-plate are respectively located between said right-leg and said left-leg and said seat when used;
   j) wherein said first leg-cushion assembly and said second leg cushion assembly in combination are structured and arranged with said first-seat-arm-engaging-plate to enable said occupant to said occupant's right-leg and said left-leg consistent on said seat;
   k) wherein said first leg-cushion and said first leg-anchor and said first-seat-arm-engaging-plate are coupled together as said first leg-cushion assembly;
   l) wherein said second leg-cushion and said second leg-anchor and said second-seat-arm-engaging-plate are coupled together as said second leg cushion assembly; and
   m) wherein said leg cushioning and relative placement system provides comfort for said occupant when travelling, said occupant occupying said seat yet able to maintain relative positioning of said right-leg and said left-leg and also reducing leg strain.

2. The leg cushioning and relative placement system of claim 1 wherein said first leg-cushion and said second leg-cushion are encased by a first covering and second covering respectively, said first leg-cushion also comprising said first-seat-arm-engaging-plate and said second leg-cushion comprising said second-seat-arm-engaging-plate said first-seat-arm-engaging-plate and said second-seat-arm-engaging-plate preventing deformation of said first leg-cushion and said second leg-cushion.

3. The leg cushioning and relative placement system of claim 2 wherein said first covering and said second covering each comprise fabric that is able to breathe.

4. The leg cushioning and relative placement system of claim 3 wherein said first leg-cushion and said second leg-cushion each comprise a semi-rigid memory foam material.

5. The leg cushioning and relative placement system of claim 4 wherein said first leg-cushion and said second leg-cushion each comprise a 3-D wedge with a wide end adjacent a knee of said user when used.

6. The leg cushioning and relative placement system of claim 5 wherein said first leg-anchor and said second leg-anchor each comprise a flat profile.

7. The leg cushioning and relative placement system of claim 6 wherein said first leg-anchor and said second leg-anchor each comprise fabric.

8. The leg cushioning and relative placement system of claim 7 wherein said first leg-anchor and said second leg-anchor each comprise a top surface and a bottom surface.

9. The leg cushioning and relative placement system of claim 8 wherein said top surface does not comprise a grip-surface.

10. The leg cushioning and relative placement system of claim 8 wherein said bottom surface comprises a grip-surface to minimize relative movement between said right-leg and said left-leg and said seat.

11. The leg cushioning and relative placement system of claim 10 wherein said first leg-cushion assembly and said second leg cushion assembly are located a distance from each other during use.

12. The leg cushioning and relative placement system of claim 10 wherein said first leg-cushion assembly and said second leg cushion assembly further comprise sleeves with adjustable extenders to prevent activation of reclining button of said seat by said first leg-cushion and said second leg-cushion.

13. The leg cushioning and relative placement system of claim 12 wherein said adjustable extenders are able to accommodate to different height seat arms.

14. The leg cushioning and relative placement system of claim 1 wherein said first leg-cushion travels along a partial-length of said right-leg.

15. The leg cushioning and relative placement system of claim 1 wherein said second leg-cushion travels along a partial-length of said left-leg.

16. The leg cushioning and relative placement system of claim 1 wherein said first leg-cushion and said second leg-cushion each further comprise a bladder and a valve that provides for self-inflation.

17. The leg cushioning and relative placement system of claim 1 wherein said first leg-cushion and said second leg-cushion each comprise pockets for storage of travel items.

18. A leg cushioning and relative placement system comprising:
    a) a first leg-cushion assembly including;
        i) a first leg-cushion;
        ii) a first leg-anchor;
        iii) a first-seat-arm-engaging-plate;
        iv) a first sleeve;
        v) a first adjustable extender;
    b) a second leg cushion assembly including;
        i) a second leg-cushion;
        ii) a second leg-anchor;
        iii) a second-seat-arm-engaging-plate;
        iv) a second sleeve; and
        v) a second adjustable extender;
    c) wherein said leg cushioning and relative placement system comprises said first leg-cushion assembly and said second leg cushion assembly and said first-seat-arm-engaging-plate in combination;
    d) wherein said first leg-cushion and said second leg-cushion and said first-seat-arm-engaging-plate provide a barrier preventing contact with an adjacent edge of a seat;
    a) wherein said first leg-cushion and said second leg-cushion comprises an inflatable element;
    b) wherein said first leg-cushion and said second leg-cushion comprises a pocket structured and arranged for storage of a travel item;
    c) wherein said first leg-anchor and said second leg-anchor are flexible;
    d) wherein said first leg-anchor and said second leg-anchor and said first-seat-arm-engaging-plate are frictionally held in place when used by a right-leg and a left-leg, respectively, said right-leg and said left-leg being of an occupant;
    e) wherein said first leg-anchor and said second leg-anchor are and said first-seat-arm-engaging-plate respectively located between said right-leg and said left-leg and said seat when used;
    f) wherein said first leg-cushion assembly and said second leg cushion assembly in combination are structured and arranged with said first-seat-arm-engaging-plate to enable said occupant to said occupant's right-leg and said left-leg consistent on said seat;
    g) wherein said first leg-cushion and said first leg-anchor and said first-seat-arm-engaging-plate are coupled together as said first leg-cushion assembly;
    h) wherein said second leg-cushion and said second leg-anchor and said second-seat-arm-engaging-plate are coupled together as said second leg cushion assembly;
    i) wherein said first covering and said second covering each comprise fabric that is able to breathe;
    j) wherein said first leg-cushion and said second leg-cushion each comprise a memory foam material;
    k) wherein said first leg-cushion and said second leg-cushion each comprise a 3-D wedge with a wide end adjacent a knee of said user when used, said wide end narrowing to a narrow end;
    l) wherein said first leg-anchor and said second leg-anchor each comprise a flat profile;
    m) wherein said first leg-anchor and said second leg-anchor each comprise fabric;
    n) wherein said first leg-cushion assembly and said second leg cushion assembly are located a distance from each other during use;
    o) wherein said first leg-cushion and said second leg-cushion are encased by a first covering and second covering respectively, said first leg-cushion also comprising a first-seat-arm-engaging-plate and said second leg-cushion comprising a second-seat-arm-engaging-plate, said first-seat-arm-engaging-plate and said second-seat-arm-engaging-plate preventing substantial deformation of said first leg-cushion and said second leg-cushion during use;
    p) wherein said first leg-cushion assembly and said second leg cushion assembly further comprise sleeves with adjustable extenders which comprise rods to prevent activation of reclining button of said seat by said first leg-cushion and said second leg-cushion;
    q) wherein said adjustable extenders are able to adjust to and accommodate different height seat arms;
    r) wherein said first leg-cushion and said second leg-cushion each travel along a partial-length of said right-leg and said left-leg, respectively;
    s) wherein said first leg-cushion and said second leg-cushion each comprise pockets for storage of travel items; and t) wherein said leg cushioning and relative placement system provides comfort for said occupant when travelling, said occupant occupying said seat yet able to maintain relative positioning of said right-leg and said left-leg and also reducing leg and core muscle fatigue.

19. The leg cushioning and relative placement system of claim 18 further comprising a kit including:
   a) said first leg-cushion assembly;
   b) said second leg-cushion assembly;
   c) a lap-desk; and
   d) a set of user instructions.

20. A method of using a leg cushioning and relative placement system of claim 18 comprising the steps of:
   a) placing a first leg-cushion assembly in place on a seat adjacent a first seat edge;
   b) placing a second leg-cushion assembly in place on said seat adjacent a second seat edge;
   c) sitting down on top of a first leg-anchor and a second leg-anchor; and
   d) adjusting as necessary to minimize leg and core fatigue and undesirable contact with other adjacent passengers.

\* \* \* \* \*